(12) United States Patent
Yoo et al.

(10) Patent No.: US 10,330,177 B2
(45) Date of Patent: Jun. 25, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Ilhan Yoo, Seongnam-si (KR); Seongwook Ji, Gunpo-si (KR); Juhyeon Park, Suwon-si (KR); Hyun Sik Kwon, Seoul (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/821,640

(22) Filed: Nov. 22, 2017

(65) Prior Publication Data
US 2019/0085946 A1 Mar. 21, 2019

(30) Foreign Application Priority Data

Sep. 20, 2017 (KR) .................. 10-2017-0121439

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ............... F16H 2200/2046–2200/2061; F16H 2200/2012–2200/2017; F16H 2200/0069
See application file for complete search history.

(56) References Cited

U.S. PATENT DOCUMENTS 8,303,454 B1 * 11/2012 Shim .................. F16H 3/66
475/280
9,175,748 B2 11/2015 Goleski et al.
9,534,670 B1 * 1/2017 Ji ....................... F16H 3/666
(Continued)

*Primary Examiner* — Charles A Fox
*Assistant Examiner* — Lillian T Nguyen
(74) *Attorney, Agent, or Firm* — Knobbe Martens Olson & Bear LLP

(57) ABSTRACT

A planetary gear train includes input and output shafts, first to fourth planetary gear sets respectively having first to third, fourth to sixth, seventh to ninth, and tenth to twelfth elements. The planetary gear train includes a first shaft connected with the first element and the sixth rotational element, and selectively connected with the input shaft, a second shaft connected with the ninth element and selectively connected with the input shaft, a third shaft connected with the eleventh element and the output shaft, a fourth shaft connected with the second, fifth, and twelfth rotational elements, a fifth shaft connected with the fourth and seventh rotational elements. The planetary gear train includes a plurality of additional shafts each selectively connecting a corresponding element to a transmission housing, the corresponding element being an element of the first, third, and fourth planetary gear sets that is not interconnected.

9 Claims, 2 Drawing Sheets

(56) References Cited

U.S. PATENT DOCUMENTS

| | | | |
|---|---|---|---|
| 9,574,639 B2* | 2/2017 | Hwang | F16H 3/66 |
| 9,587,718 B1* | 3/2017 | Kim | F16H 3/666 |
| 2009/0280947 A1* | 11/2009 | Seo | F16H 3/666 |
| | | | 475/276 |
| 2012/0270694 A1* | 10/2012 | Seo | F16H 3/66 |
| | | | 475/276 |
| 2015/0111690 A1* | 4/2015 | Shim | F16H 3/66 |
| | | | 475/280 |
| 2017/0074373 A1* | 3/2017 | Park | F16H 3/666 |

* cited by examiner

FIG. 2

| Shift-stage | Engagement element | | | | | | Gear ratio |
|---|---|---|---|---|---|---|---|
| | C1 | C2 | C3 | C4 | B1 | B2 | |
| D1 | ● | | ● | | ● | | 5.073 |
| D2 | ● | | | | ● | ● | 3.450 |
| D3 | ● | | ● | | | ● | 2.518 |
| D4 | ● | | | ● | | ● | 1.704 |
| D5 | ● | ● | | | | ● | 1.388 |
| D6 | | ● | | ● | | ● | 1.273 |
| D7 | | ● | ● | ● | | | 1.000 |
| D8 | | ● | ● | | | ● | 0.977 |
| D9 | | ● | ● | | ● | | 0.938 |
| D10 | | ● | | | ● | ● | 0.638 |
| REV | ● | | | ● | ● | | -3.015 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0121439 filed in the Korean Intellectual Property Office on Sep. 20, 2017, the entire contents of which are incorporated herein by reference.

BACKGROUND

(a) Field

The present disclosure relates to an automatic transmission for a vehicle.

(b) Description of the Related Art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven engagement elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

The present disclosure relates to a planetary gear train of an automatic transmission for a vehicle enabling at least ten forward speeds, thereby providing better performance and fuel efficiency of a vehicle.

A planetary gear train according to an embodiment includes an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, and a fourth planetary gear set having tenth, eleventh, and twelfth rotational elements. An planetary gear train may further include a first shaft fixedly connected with the first rotational element and the sixth rotational element, and selectively connected with the input shaft, a second shaft fixedly connected with the ninth rotational element and selectively connected with the input shaft, a third shaft fixedly connected with the eleventh rotational element and fixedly connected with the output shaft, a fourth shaft fixedly connected with the second rotational element, the fifth rotational element, and the twelfth rotational element, a fifth shaft fixedly connected with the fourth rotational element and the seventh rotational element, and a plurality of shafts each selectively connecting a corresponding element to the transmission housing, the corresponding element being a rotational element of the first, third, and fourth planetary gear sets that is not fixedly interconnected.

The plurality of shafts may include a sixth shaft fixedly connected with the third rotational element and the eighth rotational element and selectively connected with the transmission housing, and a seventh shaft fixedly connected with the tenth rotational element and selectively connected with the transmission housing. The input shaft and the first shaft, the input shaft and the second shaft, the fifth shaft and the seventh shaft, and the third shaft and the fifth shaft may be selectively interconnected with each other respectively.

The planetary gear train may further include four clutches each selectively connecting a corresponding pair among the input shaft, the output shaft, and the first to seventh shafts, and two brakes selectively connecting the sixth shaft and the seventh shaft to the transmission housing respectively.

The four clutches may include a first clutch arranged between the input shaft and the first shaft, a second clutch arranged between the input shaft and the second shaft, a third clutch arranged between the fifth shaft and the seventh shaft, and a fourth clutch arranged between the third shaft and the fifth shaft. The two brakes may include a first brake arranged between the sixth shaft and the transmission housing, and a second brake arranged between the seventh shaft and the transmission housing.

The first planetary gear set may be a single pinion planetary gear set having a first sun gear, a first planet carrier, and a first ring gear as the first, second, and third rotational elements. The second planetary gear set may be a double pinion planetary gear set having a second sun gear, a second planet carrier, and a second ring gear as the fourth, fifth, and sixth rotational elements. The third planetary gear set may be a single pinion planetary gear set having a third sun gear, a third planet carrier, and a third ring gear as the seventh, eighth, and ninth rotational elements. The fourth planetary gear set may be a single pinion planetary gear set having a fourth sun gear, a fourth planet carrier, and a fourth ring gear as the tenth, eleventh, and twelfth rotational elements.

A planetary gear train according to an embodiment of the present invention may realize at least ten forward speeds and one reverse speed by combination of four planetary gear sets of simple planetary gear sets together with six engagement elements.

In addition, a planetary gear train according to an embodiment of the present invention may substantially improve driving stability by realizing shift-stages appropriate for rotation speed of an engine due to multi-stages of an automatic transmission. In addition, a planetary gear train according to an embodiment of the present invention may maximize engine driving efficiency by multi-stages of an automatic transmission, and may improve power delivery performance and fuel consumption.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

FIG. 2 is an operational chart for respective control elements at respective shift-stages applicable to a planetary gear train according to an embodiment of the present invention.

DETAILED DESCRIPTION

Figure 1:
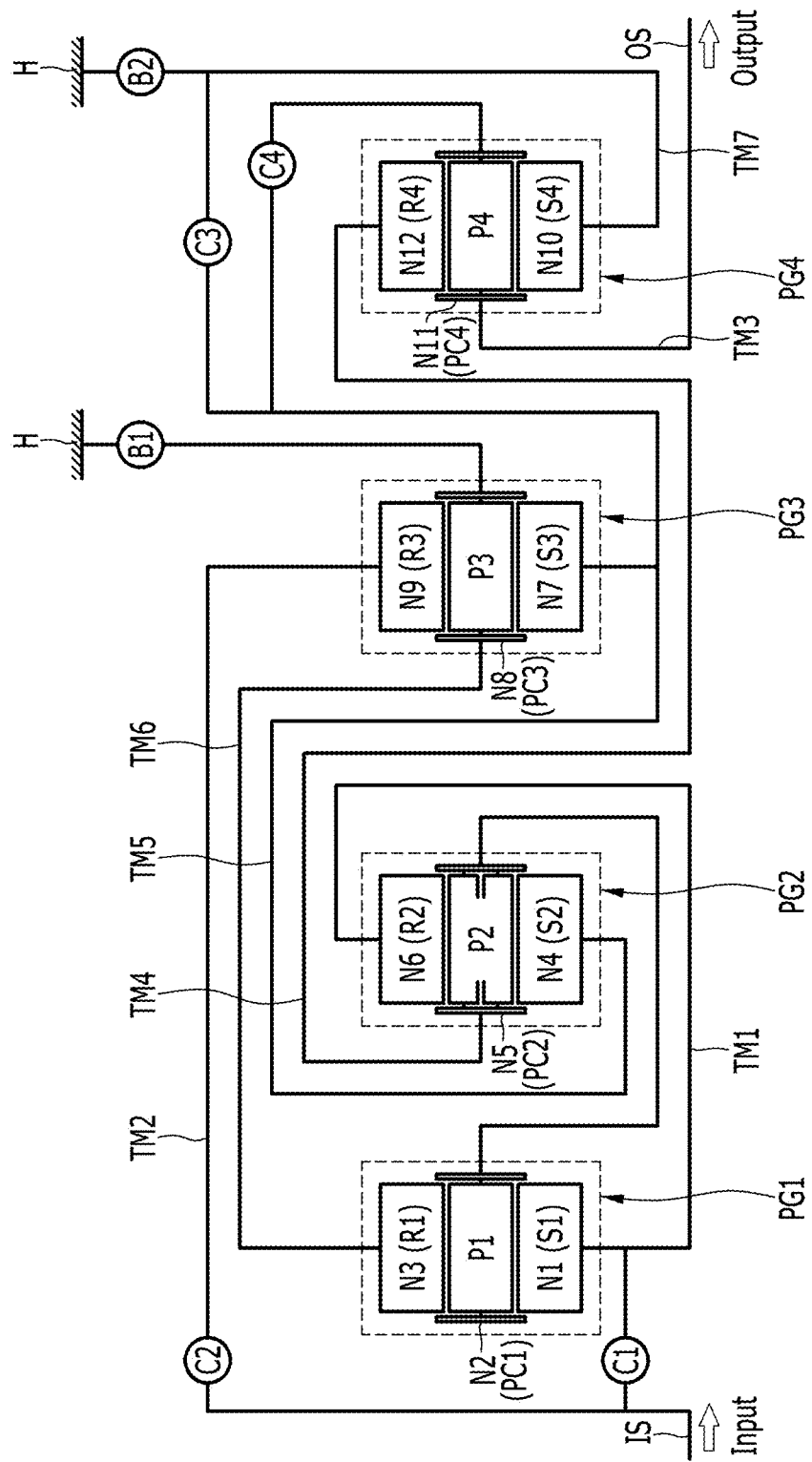
FIG. 1 is a schematic diagram of a planetary gear train according to an embodiment of the present invention.

Hereinafter, embodiments of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an embodiment of the present invention.

Referring to FIG. 1, a planetary gear train according to an embodiment of the present invention includes first, second, third, and fourth planetary gear sets PG1, PG2, PG3, and PG4 arranged on a same axis, an input shaft IS, an output shaft OS, seven shafts TM1 to TM7 interconnecting rotational elements of the first, second, third, and fourth planetary gear sets PG1, PG2, PG3, and PG4, engagement elements of four clutches C1 to C4 and two brakes B1 and B2, and a transmission housing H (fixed).

Torque input from the input shaft IS is shifted by cooperative operation of the first, second, third, and fourth planetary gear sets PG1, PG2, PG3, and PG4, and then output through the output shaft OS.

The planetary gear sets are arranged in the order of the first, the second, and the third, and fourth planetary gear sets PG1, PG2, PG3, and PG4, from an engine side.

The input shaft IS is an input member and may receive a torque from a crankshaft of an engine through a torque converter.

The output shaft OS is an output member arranged on a same axis with the input shaft IS, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1 engaged with the first sun gear S1. The first sun gear S1 acts as a first rotational element N1, the first planet carrier PC1 acts as a second rotational element N2, and the first ring gear R1 acts as a third rotational element N3.

The second planetary gear set PG2 is a double pinion planetary gear set, and includes a second sun gear S2, a second planet carrier PC2 rotatably supporting a plurality of second pinion gears P2 in pairs externally gear-meshed with the second sun gear S2, and a second ring gear R2 internally gear-meshed with the plurality of second pinion gears P2 engaged with the second sun gear S2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, a third ring gear R3 internally gear-meshed with the plurality of third pinion gears P3 engaged with the third sun gear S3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4 engaged with the fourth sun gear S4. The fourth sun gear S4 acts as a tenth rotational element N10, the fourth planet carrier PC4 acts as an eleventh rotational element N11, and the fourth ring gear R4 acts as a twelfth rotational element N12.

In the first, second, third, and fourth planetary gear sets PG1, PG2, PG3, and PG4, the first rotational element N1 is fixedly connected with the sixth rotational element N6, the second rotational element N2 is fixedly connected with the fifth rotational element N5 and the twelfth rotational element N12, the third rotational element N3 is fixedly connected with the eighth rotational element N8, the fourth rotational element N4 is fixedly connected with the seventh rotational element N7, and seven shafts TM1 to TM7 are formed.

The seven shafts TM1 to TM7 are hereinafter described in detail.

The first shaft TM1 is fixedly connected with first rotational element N1 (first sun gear S1) and sixth rotational element N6 (second ring gear R2), and selectively connected with the input shaft IS thereby selectively acting as an input element.

The second shaft TM2 is fixedly connected with the ninth rotational element N9 (third ring gear R3), and selectively connected with the input shaft IS thereby selectively acting as an input element.

The third shaft TM3 is fixedly connected with the eleventh rotational element N11 (fourth planet carrier PC4), and fixedly connected with the output shaft OS thereby always acting as an output element.

The fourth shaft TM4 is fixedly connected with the second rotational element (N2; second planet carrier PC2), the fifth rotational element N5 (second planet carrier PC2), and the twelfth rotational element N12 (fourth ring gear R4).

The fifth shaft TM5 is fixedly connected with the fourth rotational element N4 (second sun gear S2) and the seventh rotational element (N7; third sun gear S1).

The sixth shaft TM6 is fixedly connected with the third rotational element N3 (first ring gear R1) and the eighth rotational element N8 (third planet carrier PC3), and selectively connected with the transmission housing H, thereby selectively acting as a fixed element.

The seventh shaft TM7 is fixedly connected with the tenth rotational element N10 (fourth sun gear S4), and selectively connected with the transmission housing H, thereby selectively acting as a fixed element.

Each of the seven shafts TM1 to TM7 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In disclosure, when two or more members are described to be "fixedly connected", where the member may be any of a shaft, an input shaft, an output shaft, and a rotational member, it means that the fixedly connected members always rotate at the same speed. In embodiments, two members (elements) that are fixedly connected by a shaft, move together to rotate about a rotational axis at the same speed. In embodiments, when a member is fixedly connected to a transmission housing, the member does not rotate about a rotational axis of transmission. In embodiments, when two members are fixedly connected and one of them is fixedly connected to a transmission housing, the two fixedly connected members do not rotate about a rotational axis of a transmission.

When two or more members are described to be "selectively connected" by an engagement element, it means that the selectively connected members rotates separately when the engagement element is not engaged, and rotates at a same speed when the engagement element is engaged. It may be understood that in the case that a member is "selectively connected" with a transmission housing by an engagement element, the member may be stationary when the engagement element is engaged. In embodiments, two members are selectively connected such that the two members operate (1) to move together when being engaged (fixedly connected) or (2) to move independently when they are not engaged. In embodiment, when a member is engaged with a transmission housing, the member does not rotate about a rotational axis of a transmission.

The first shaft TM1 and the second shaft TM2 are selectively connected with the input shaft IS respectively, and the fifth shaft TM5 is selectively connected with the third shaft TM3 and the seventh shaft TM7 respectively.

The sixth shaft TM6 and the seventh shaft TM7 are selectively connected with the transmission housing H, thereby selectively acting as fixed elements respectively.

The engagement elements of four clutches C1, C2, C3, and C4 are arranged between the seven shafts TM1 to TM7, the input shaft IS, and the output shaft OS, so as to form selective connections.

The seven shafts TM1 to TM7 may be selectively connected with the transmission housing H, by control elements of two brakes B1 and B2.

The six engagement elements of the four clutches C1 to C4 and the two brakes B1 and B2 are arranged as follows.

The first clutch C1 is arranged between the input shaft IS and the first shaft TM1, and selectively connects the input shaft IS and the first shaft TM1, thereby controlling power delivery therebetween.

The second clutch C2 is arranged between the input shaft IS and the second shaft TM2, and selectively connects the input shaft IS and the second shaft TM2, thereby controlling power delivery therebetween.

The third clutch C3 is arranged between the fifth shaft TM5 and the seventh shaft TM7, and selectively connects the fifth shaft TM5 and the seventh shaft TM7, thereby controlling power delivery therebetween.

The fourth clutch C4 is arranged between the third shaft TM3 and the fifth shaft TM5, and selectively connects the third shaft TM3 and the fifth shaft TM5, thereby controlling power delivery therebetween.

The first brake B1 is arranged between the sixth shaft TM6 and the transmission housing H, and selectively connects the sixth shaft TM6 to the transmission housing H.

The second brake B2 is arranged between the seventh shaft TM7 and the transmission housing H, and selectively connects the seventh shaft TM7 to the transmission housing H.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart for respective control elements at respective shift-stages applicable to a planetary gear train according to an embodiment of the present invention.

Referring to FIG. 2, a planetary gear train according to an embodiment of the present invention realizes shifting between ten forward speeds and one reverse speed by operating three elements among the engagement elements of the first, second, third, and fourth clutches C1, C2, C3, and C4 and the first and second brakes B1 and B2.

In the forward first speed D1, the first and third clutches C1 and C3 and the first brake B1 are simultaneously operated.

As a result, the first shaft TM1 is connected with the input shaft IS by the operation of the first clutch C1, and the fifth shaft TM5 is connected with the seventh shaft TM7 by the operation of the third clutch C3. In this state, an input torque is input to the first shaft TM1.

In addition, the sixth shaft TM6 acts as a fixed element by the operation of the first brake B1, thereby realizing the forward first speed and outputting a shifted torque to the output shaft OS connected with the third shaft TM3.

In the forward second speed D2, the first clutch C1 and the first and second brakes B1 and B2 are simultaneously operated.

As a result, the first shaft TM1 is connected with the input shaft IS by the operation of the first clutch C1. In this state, the input torque is input to the first shaft TM1.

In addition, the sixth shaft TM6 and the seventh shaft TM7 act as fixed elements by the operation of the first and second brakes B1 and B2, thereby realizing the forward second speed and outputting a shifted torque to the output shaft OS connected with the third shaft TM3.

In the forward third speed D3, the first and third clutches C1 and C3 and the second brake B2 are simultaneously operated.

As a result, the first shaft TM1 is connected with the input shaft IS by the operation of the first clutch C1, and the fifth shaft TM5 is connected with the seventh shaft TM7 by the operation of the third clutch C3. In this state, an input torque is input to the first shaft TM1.

In addition, the seventh shaft TM7 acts as a fixed element by the operation of the second brake B2, thereby realizing the forward third speed and outputting a shifted torque to the output shaft OS connected with the third shaft TM3.

In the forward fourth speed D4, the first and fourth clutches C1 and C4 and the second brake B2 are simultaneously operated.

As a result, the first shaft TM1 is connected with the input shaft IS by the operation of the first clutch C1, and the third shaft TM3 is connected with the fifth shaft TM5 by the operation of the fourth clutch C4. In this state, an input torque is input to the first shaft TM1.

In addition, the seventh shaft TM7 acts as a fixed element by the operation of the second brake B2, thereby realizing the forward fourth speed and outputting a shifted torque to the output shaft OS connected with the third shaft TM3.

In the forward fifth speed D5, the first and second clutch C1 and C2 and the second brake B2 are simultaneously operated.

As a result, the first shaft TM1 and the second shaft TM2 are fixedly connected with the input shaft IS by the operation of the first and second clutches C1 and C2 respectively. In this state, an input torque is input to the first shaft TM1 and the second shaft TM2.

In addition, the seventh shaft TM7 acts as a fixed element by the operation of the second brake B2, thereby realizing the forward fifth speed and outputting a shifted torque to the output shaft OS connected with the third shaft TM3.

In the forward sixth speed D6, the second and fourth clutches C2 and C4 and the second brake B2 are simultaneously operated.

As a result, the second shaft TM2 is connected with the input shaft IS by the operation of the second clutch C2, and the third shaft TM3 is connected with the fifth shaft TM5 by the operation of the fourth clutch C4. In this state, a torque is input to the second shaft TM2.

In addition, the seventh shaft TM7 acts as a fixed element by the operation of the second brake B2, thereby realizing the forward sixth speed and outputting a shifted torque to the output shaft OS connected with the third shaft TM3.

In the forward seventh speed D7, the second, third, and fourth clutches C2, C3, and C4 are simultaneously operated.

As a result, the second shaft TM2 is connected with the input shaft IS by the operation of the second clutch C2, the fifth shaft TM5 is connected with the seventh shaft TM7 by the operation of the third clutch C3, and the third shaft TM3 is fixedly connected with the fifth shaft TM5 by the operation of the fourth clutch C4.

Then, the first, second, third, and fourth planetary gear sets PG1, PG2, PG3, and PG4 integrally rotate, and a torque is input to the second shaft TM2, thereby realizing the forward seventh speed where a torque is output as inputted, and outputting a shifted torque to the output shaft OS connected with the third shaft TM3.

In the forward eighth speed D8, the second and third clutches C2 and C3 and the second brake B2 are simultaneously operated.

As a result, the second shaft TM2 is connected with the input shaft IS by the operation of the second clutch C2, and the fifth shaft TM5 is connected with the seventh shaft TM7 by the operation of the third clutch C3. In this state, a torque is input to the second shaft TM2.

In addition, the seventh shaft TM7 acts as a fixed element by the operation of the second brake B2, thereby realizing the forward eighth speed and outputting a shifted torque to the output shaft OS connected with the third shaft TM3.

In the forward ninth speed D9, the second and third clutches C2 and C3 and the first brake B1 are simultaneously operated.

As a result, the second shaft TM2 is connected with the input shaft IS by the operation of the second clutch C2, and the fifth shaft TM5 is connected with the seventh shaft TM7 by the operation of the third clutch C3. In this state, a torque is input to the second shaft TM2.

In addition, the sixth shaft TM6 acts as a fixed element by the operation of the first brake B1, thereby realizing the forward ninth speed and outputting a shifted torque to the output shaft OS connected with the third shaft TM2.

In the forward tenth speed D10, the second clutch C2 and the first and second brakes B1 and B2 are simultaneously operated.

As a result, the second shaft TM2 is connected with the input shaft IS by the operation of the second clutch C2. In this state, the input torque is input to the second shaft TM2.

In addition, the sixth shaft TM6 and the seventh shaft TM7 act as fixed elements by the operation of the first and second brakes B1 and B2, thereby realizing the forward tenth speed and outputting a shifted torque to the output shaft OS connected with the third shaft TM3.

In the reverse speed REV, the first and fourth clutches C1 and C4 and the first brake B1 are simultaneously operated.

As a result, the first shaft TM1 is connected with the input shaft IS by the operation of the first clutch C1, and the third shaft TM3 is connected with the seventh shaft TM7 by the operation of the fourth clutch C4. In this state, an input torque is input to the first shaft TM1.

In addition, the sixth shaft TM6 acts as a fixed element by the operation of the first brake B1, thereby realizing the reverse speed and outputting a shifted torque to the output shaft OS connected with the third shaft TM3.

As described above, a planetary gear train according to an embodiment of the present invention may realize ten forward speeds and one reverse speed by operating the four planetary gear sets PG1, PG2, PG3, and PG4 by controlling the four clutches C1, C2, C3, and C4 and the two brakes B1 and B2.

In addition, a planetary gear train according to an embodiment of the present invention may substantially improve driving stability by realizing shift-stages appropriate for rotation speed of an engine due to multi-stages of an automatic transmission. In addition, a planetary gear train according to an embodiment of the present invention may maximize engine driving efficiency by multi-stages of an automatic transmission, and may improve power delivery performance and fuel consumption.

While this invention has been described in connection with embodiments of the invention, it is to be understood that the invention is not limited to the disclosed embodiments, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7: first, second, third, fourth, fifth, sixth, and seventh shafts

What is claimed is:

1. A planetary gear train of an automatic transmission for a vehicle, comprising:
   an input shaft for receiving torque from an engine;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft fixedly connected with the first rotational element and the sixth rotational element, and selectively connected with the input shaft;
   a second shaft fixedly connected with the ninth rotational element and selectively connected with the input shaft;
   a third shaft fixedly connected with the eleventh rotational element and fixedly connected with the output shaft;
   a fourth shaft fixedly connected with the second rotational element, the fifth rotational element, and the twelfth rotational element;
   a fifth shaft fixedly connected with the fourth rotational element and the seventh rotational element; and
   a plurality of additional shafts each selectively connecting a corresponding element to a transmission housing, the corresponding element being a rotational element of the first, third, and fourth planetary gear sets that is not fixedly interconnected.

2. The planetary gear train of claim 1, wherein the plurality of additional shafts comprises:
   a sixth shaft fixedly connected with the third rotational element and the eighth rotational element and selectively connected with the transmission housing; and
   a seventh shaft fixedly connected with the tenth rotational element and selectively connected with the transmission housing,
   wherein the input shaft and the first shaft, the input shaft and the second shaft, the fifth shaft and the seventh shaft, and the third shaft and the fifth shaft are selectively interconnected with each other respectively.

3. The planetary gear train of claim 2, further comprising:
   four clutches each configured to selectively connect two elements among the input shaft, the output shaft, and the first to seventh shafts; and
   two brakes configured to selectively connect the sixth shaft and the seventh shaft to the transmission housing respectively.

4. The planetary gear train of claim 3, wherein the four clutches comprise:
   a first clutch configured to selectively connect between the input shaft and the first shaft;
   a second clutch configured to selectively connect between the input shaft and the second shaft;
   a third clutch configured to selectively connect between the fifth shaft and the seventh shaft; and
   a fourth clutch configured to selectively connect between the third shaft and the fifth shaft,
   wherein the two brakes comprise:
   a first brake configured to selectively connect between the sixth shaft and the transmission housing; and
   a second brake configured to selectively connect between the seventh shaft and the transmission housing.

5. The planetary gear train of claim 1, wherein:
   the first planetary gear set is a single pinion planetary gear set having a first sun gear, a first planet carrier, and a first ring gear as the first, second, and third rotational elements,
   the second planetary gear set is a double pinion planetary gear set having a second sun gear, a second planet carrier, and a second ring gear as the fourth, fifth, and sixth rotational elements,
   the third planetary gear set is a single pinion planetary gear set having a third sun gear, a third planet carrier, and a third ring gear as the seventh, eighth, and ninth rotational elements,
   the fourth planetary gear set is a single pinion planetary gear set having a fourth sun gear, a fourth planet carrier, and a fourth ring gear as the tenth, eleventh, and twelfth rotational elements.

6. A planetary gear train of an automatic transmission for a vehicle, comprising:
   an input shaft for receiving torque from an engine;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements,
   wherein the first rotational element is fixedly connected with the sixth rotational element, and selectively connected with the input shaft,
   the second rotational element is fixedly connected with the fifth rotational element and the twelfth rotational element,
   the third rotational element is fixedly connected with the eighth rotational element, and selectively connected with a transmission housing,
   the fourth rotational element is fixedly connected with the seventh rotational element,
   the ninth rotational element is selectively connected with the input shaft,
   the tenth rotational element is selectively connected with the seventh rotational element and the transmission housing respectively, and
   the eleventh rotational element is selectively connected with the seventh rotational element, and fixedly connected with the output shaft.

7. The planetary gear train of claim 6, further comprising:
   four clutches each configured to selectively connect two among the input shaft, the output shaft, and the rotational elements; and
   two brakes configured to selectively connect the eighth rotational element and the tenth rotational element to the transmission housing respectively.

8. The planetary gear train of claim 7, wherein the four clutches comprise:
   a first clutch configured to selectively connect the input shaft and the first rotational element;
   a second clutch configured to selectively connect the input shaft and the ninth rotational element;
   a third clutch configured to selectively connect between the seventh rotational element and the tenth rotational element; and
   a fourth clutch configured to selectively connect between the seventh rotational element and the eleventh rotational element, wherein the two brakes comprise:
a first brake configured to selectively connect between the eighth rotational element and the transmission housing; and
a second brake configured to selectively connect between the tenth rotational element and the transmission housing.

9. The planetary gear train of claim 6, wherein:
the first planetary gear set is a single pinion planetary gear set having a first sun gear, a first planet carrier, and a first ring gear as the first, second, and third rotational elements,
the second planetary gear set is a double pinion planetary gear set having a second sun gear, a second planet carrier, and a second ring gear as the fourth, fifth, and sixth rotational elements,
the third planetary gear set is a single pinion planetary gear set having a third sun gear, a third planet carrier, and a third ring gear as the seventh, eighth, and ninth rotational elements,
the fourth planetary gear set is a single pinion planetary gear set having a fourth sun gear, a fourth planet carrier, and a fourth ring gear as the tenth, eleventh, and twelfth rotational elements.

* * * * *